United States Patent
Causemann et al.

(10) Patent No.: US 10,800,336 B2
(45) Date of Patent: Oct. 13, 2020

(54) FREE FLOATING COVER PANEL FOR STORAGE AREA, AND CORRESPONDING METHOD

(71) Applicant: Ford Global Technologies, LLC, Dearborn, MI (US)

(72) Inventors: Christian Causemann, Cologne (DE); Frank Schneider, Iserlohn (DE); Thomas Loewe, Buchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 133 days.

(21) Appl. No.: 16/214,705

(22) Filed: Dec. 10, 2018

(65) Prior Publication Data

US 2019/0210534 A1 Jul. 11, 2019

(30) Foreign Application Priority Data

Jan. 5, 2018 (DE) .......................... 10 2018 200 114

(51) Int. Cl.
*B60J 5/04* (2006.01)
*B60R 5/04* (2006.01)

(52) U.S. Cl.
CPC .............. *B60R 5/045* (2013.01); *B60R 5/044* (2013.01)

(58) Field of Classification Search
CPC .......... B60R 5/045; B60R 5/044; B60R 5/047
USPC ........................................... 296/24.44, 24.43
See application file for complete search history.

(56) References Cited

U.S. PATENT DOCUMENTS

| | | | |
|---|---|---|---|
| 4,222,600 A | 9/1980 | Cripps et al. | |
| 4,479,675 A * | 10/1984 | Zankl | B60R 5/044 16/230 |
| 8,172,296 B2 | 5/2012 | Umeda et al. | |
| 9,637,058 B1 * | 5/2017 | Garcia Zarco | B60N 3/002 |
| 2008/0277957 A1 * | 11/2008 | Hirayama | B60R 5/047 296/37.16 |
| 2011/0057467 A1 * | 3/2011 | Umeda | B60R 5/045 296/37.8 |
| 2015/0375682 A1 * | 12/2015 | Matsubara | B60R 5/044 296/24.44 |
| 2017/0144607 A1 * | 5/2017 | Utsunomiya | B60R 5/045 |
| 2018/0186307 A1 * | 7/2018 | Aguilera Ramirez | B60R 13/07 |
| 2018/0297531 A1 * | 10/2018 | Baumann | B60R 5/045 |
| 2019/0009726 A1 * | 1/2019 | Fleischhacker | B60R 5/045 |
| 2019/0168675 A1 * | 6/2019 | Jeunesse | B60R 5/044 |
| 2019/0225158 A1 * | 7/2019 | Loewe | B60R 5/044 |
| 2019/0375345 A1 * | 12/2019 | Blom | B60R 5/045 |

FOREIGN PATENT DOCUMENTS

| | | |
|---|---|---|
| EP | 0041016 B1 | 12/1983 |
| EP | 0120763 A1 | 10/1984 |
| EP | 1447311 B1 | 11/2007 |
| WO | 2010103206 A1 | 9/2010 |

* cited by examiner

*Primary Examiner* — Jason S Morrow
(74) *Attorney, Agent, or Firm* — David Coppiellie; Carlson, Gaskey & Olds, P.C.

(57) ABSTRACT

A cover panel for a storage area of a motor vehicle, and a corresponding method, is disclosed. An example motor vehicle includes, among other things, a rear loading flap providing access to a storage area, and a cover panel connected to the rear loading flap such that, when the rear loading flap is in a closed position, the cover panel provides an upper boundary of the storage area and is supported solely by the rear loading flap.

18 Claims, 3 Drawing Sheets

FREE FLOATING COVER PANEL FOR STORAGE AREA, AND CORRESPONDING METHOD

RELATED APPLICATION(S)

This application claims priority to German Patent Application No. 102018200114.6, filed on Jan. 5, 2018, the entirety of which is herein incorporated by reference.

TECHNICAL FIELD

The present disclosure relates to a cover panel for a storage area of a motor vehicle, and a corresponding method.

BACKGROUND

Motor vehicles typically include a storage areas for accommodating cargo and/or baggage. Such storage areas are arranged in the rear of a motor vehicle, behind a rear bench seat, and is typically accessible via a rear loading flap, such as a tailgate, trunk lid, or liftgate. The rear loading flap can be pivoted from an open position to a closed position, and vice versa. Depending on the vehicle model, the storage area volume and the storage area opening of the storage area may be spatially limited.

To separate the storage areas from the passenger cabin and thus protect the occupants from unsecured cargo, for example during abrupt braking or in the event of an accident, storage areas may bounded in its upper region by a cover panel. Known cover panels usually extend parallel to, and at a distance above a lower loading surface of the storage area. Such cover panels are typically arranged behind or adjoin the rear bench seat of the vehicle. An upper storage surface of the cover panel is accessible for the occupants of the passenger car from the passenger cabin and can be used for storage of a wide variety of objects.

Known cover panels are connected to an inner portion of the rear loading flap by two connecting strings attached to the cover panel at a rear-side corner thereof. The front of the cover panel can be pivotably fastened adjacent rear bench seat, with the result that, upon opening of the rear loading flap, the cover panel pivots upward by virtue of the connecting strings in order to make the storage area more easily accessible. For additional stability, lateral edges of the cover panel may contact respective lateral surface of the storage area.

In order to be able to use the entire storage area, storage area cover panels can often be removed and can be stored in the passenger cabin. The storage area is then no longer bounded on the upper side by the cover panel. In many motor vehicles, the rear seats can be folded down to further expand the storage area. In that case, the cover panel can only be stored in the passenger cabin to the extent that there are no passengers seated therein.

The prior art discloses a plurality of cover panels for storage spaces of motor vehicles. For example, U.S. Pat. No. 8,172,296 discloses a two-part shelf which increases the space available for loading when a rear loading flap is opened. The front part of the shelf is pivotably mounted to a rear bench seat and is connected to the inner surface of the rear loading flap by two cord connections. A rear part of the parcel shelf is rigidly connected to the rear loading flap.

U.S. Pat. No. 4,222,600 discloses a cover pivotably connected to the inner side of a rear loading flap. With the rear loading flap closed, a front edge of the cover contacts a rear bench seat. With the rear loading flap opened, the pivots away from the rear bench seat. If the cover is not required, it can be stowed within the vehicle.

Another cover is disclosed in EP 0 041 016, which is pivotably connected at its rear edge to a rear loading flap, and which includes a front edge connected at each of its corners to the rear loading flap extending above it by means of a cord. Upon opening of the rear loading flap, the cord, which is biased by means of a spring, is drawn into the interior of the cover panel, with the result that the cover panel is pivoted and rotates against the rear loading flap.

Yet another cover is disclosed in EP 0 120 763 B1, which discloses a cover panel integrally connected to the glazed region of the rear loading flap. A front edge of the cover panel lies on a supporting surface which extends behind a rear bench seat into the interior of the storage area. Upon opening of the luggage compartment, the cover panel swings upward together with the rear loading flap.

WO 2010/103206 A1 also discloses a cover panel for the storage area of a vehicle. A rear edge of the cover panel is connected to the rear loading flap of the vehicle, and a front edge of the cover panel is connected to the roof of the vehicle via at least one connecting element. The connection is a pivotable connection such that the cover panel is oriented horizontally if the rear loading flap is closed. Upon opening of the rear loading flap, the cover panel assumes a stored configuration in which it is raised in the direction of the rear loading flap and in which the connecting element contacts the roof of the vehicle.

SUMMARY

A motor vehicle according to an exemplary aspect of the present disclosure includes, among other things, a rear loading flap providing access to a storage area, and a cover panel connected to the rear loading flap such that, when the rear loading flap is in a closed position, the cover panel provides an upper boundary of the storage area and is supported solely by the rear loading flap.

In a further non-limiting embodiment of the foregoing motor vehicle, when the rear loading flap is in the closed position, the cover panel extends substantially parallel to a storage area surface that bounds the storage area on a lower side.

In a further non-limiting embodiment of any of the foregoing motor vehicles, the cover panel includes a connecting element along each side edge thereof, and each connecting element is releasably connected to the rear loading flap.

In a further non-limiting embodiment of any of the foregoing motor vehicles, the connecting elements have a fastening point arranged above a rear edge of the cover panel, and the cover panel is releasably connected to the rear loading flap by way of a connection passing through the fastening point.

In a further non-limiting embodiment of any of the foregoing motor vehicles, when the rear loading flap is in the closed position, a front edge of the cover panel contacts a rear seat of the motor vehicle while the cover panel remains completely supported by the rear loading flap without assistance from the rear seat.

In a further non-limiting embodiment of any of the foregoing motor vehicles, when the rear loading flap is in an open position, the cover panel is vertically spaced above the rear seat.

In a further non-limiting embodiment of any of the foregoing motor vehicles, a rear edge of the cover panel includes at least one rear connection releasably connected to the rear loading flap.

In a further non-limiting embodiment of any of the foregoing motor vehicles, the at least one rear connection includes two rear connections.

In a further non-limiting embodiment of any of the foregoing motor vehicles, the at least one rear connection and the connecting elements are foldable onto an upper surface of the cover panel.

In a further non-limiting embodiment of any of the foregoing motor vehicles, the connecting elements are foldable about the side edge while being rigidly connected thereto.

In a further non-limiting embodiment of any of the foregoing motor vehicles, the connecting elements comprise a flexible material.

In a further non-limiting embodiment of any of the foregoing motor vehicles, the connecting elements comprise fabric.

In a further non-limiting embodiment of any of the foregoing motor vehicles, the motor vehicle includes a lower area beneath a removable loading surface floor of the storage area, and the cover panel can be detached from the rear loading flap and stored in the lower area.

In a further non-limiting embodiment of any of the foregoing motor vehicles, the cover panel comprises a foamed material.

A method according to an exemplary aspect of the present disclosure includes, among other things, closing a rear loading flap of a motor vehicle so as to arrange a cover panel adjacent a storage area of a motor vehicle. Further, the cover panel provides an upper boundary of the storage area and is supported solely by the rear loading flap.

In a further non-limiting embodiment of the foregoing method, the method includes opening the rear loading flap of the motor vehicle such that the cover panel becomes spaced vertically above a rear seat of the motor vehicle.

In a further non-limiting embodiment of any of the foregoing methods, the cover panel includes a connecting element along each side edge thereof, with each connecting element being releasably connected to the rear loading flap. Further, the method includes detaching the cover panel from the rear loading flap by detaching the connecting elements from the rear loading flap.

In a further non-limiting embodiment of any of the foregoing methods, the cover panel includes at least one rear connection releasably connected to the rear loading flap. Further, the method includes detaching the cover panel from the rear loading flap by detaching the rear connection from the rear loading flap.

In a further non-limiting embodiment of any of the foregoing methods, the method includes folding the connection elements and the rear connection onto an upper surface of the cover panel.

In a further non-limiting embodiment of any of the foregoing methods, the method includes storing the cover panel in an area beneath a loading surface floor of the storage area.

BRIEF DESCRIPTION OF THE DRAWINGS

In FIG. 2, a rear loading flap of the motor vehicle is in a closed position.

In FIG. 3, the rear loading flap of the motor vehicle is in an open position.

DETAILED DESCRIPTION

Figure 1:
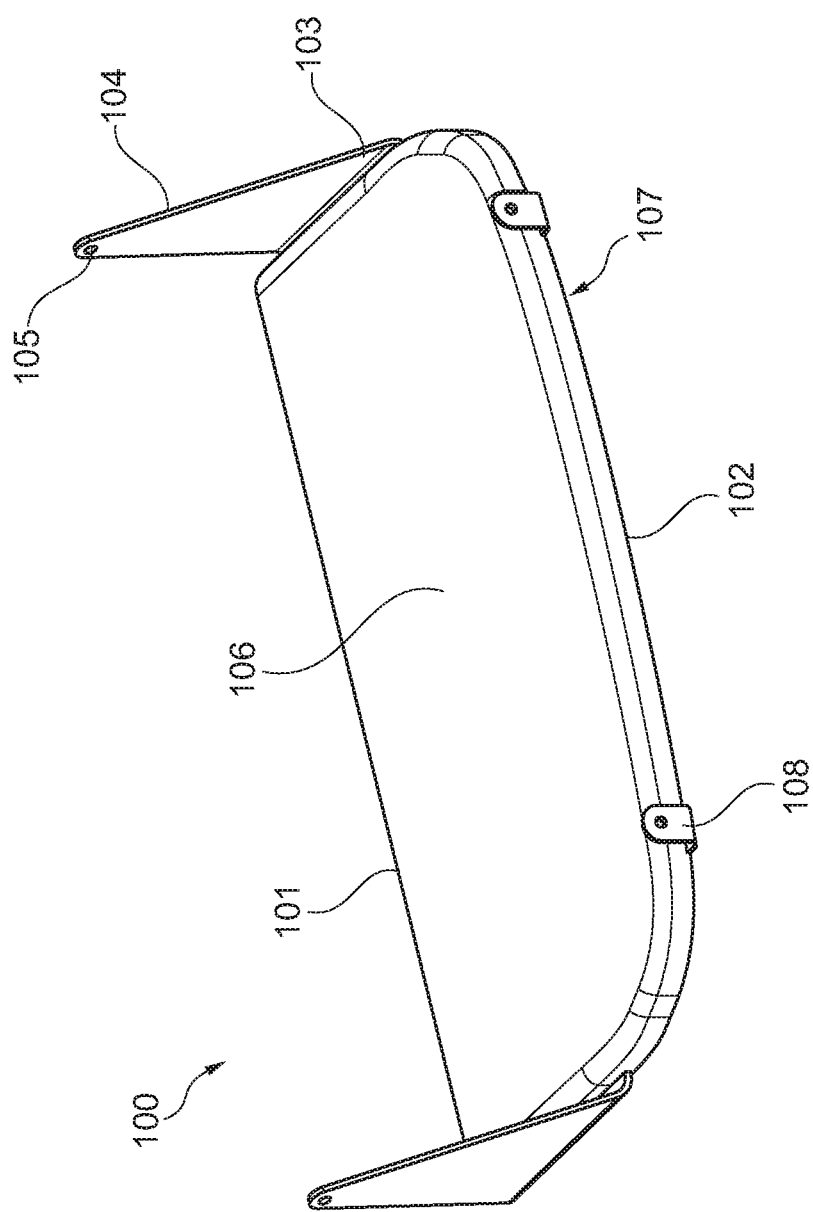
FIG. 1 illustrates an example cover panel.

The present disclosure relates to a cover panel for a storage area of a motor vehicle, and a corresponding method. An example motor vehicle includes, among other things, a rear loading flap providing access to a storage area, and a cover panel connected to the rear loading flap such that, when the rear loading flap is in a closed position, the cover panel provides an upper boundary of the storage area and is supported solely by the rear loading flap.

The object on which this disclosure is based to provide a cover panel for a that improves the accessibility and the volume of the storage area. An example cover panel includes a front edge adjacent an interior of the vehicle and a rear edge adjacent a rear loading flap of the vehicle. When the rear loading flap is in a closed position, the cover panel extends substantially horizontally, parallel to a storage area surface of the storage area that bounds the storage area on the lower side. The cover panel bounds the storage area on the upper side. Further, when the rear loading flap is in the closed position, the storage area is thus bounded on the upper side by the cover panel, on the lower side by the storage area surface, on the rear side by the rear loading flap, on the front side by a front-side storage area boundary (i.e., a rear bench seat), and the lateral boundaries are provided by the inner surfaces of the lateral portions of the vehicle body.

Further, the cover panel has a connecting element along each of its side edges. The connecting elements are releasably connected to a front region of the rear loading flap in such a way that, in the closed position of the rear loading flap, the cover panel is arranged in a freely floating manner within the storage area. In particular, "freely floating" or "free floating" in this disclosure means that the cover panel is supported solely by the rear loading flap, and in particular is not supported by the side panels of the storage area or the rear seats of the vehicle. While the cover panel may abut these structures, the weight of the cover panel is fully supported by the rear loading flap, and not by the rear seats or side panels of the storage area, as examples. This is in direct contrast to the prior art discussed in the background section of this disclosure.

Overall, the cover panel is thus releasably connected to the rear loading flap without lying on other bearing surfaces and/or supporting elements. In other words, it is possible to dispense with the bearing surfaces known from the prior art that project laterally into the storage area, with the result that the storage area volume and the storage area opening are each increased. Nor is there provision according to the invention for a supporting on and/or a fastening to the rear bench seat and/or elements of the rear bench seat. Instead, the cover panel is connected exclusively to the rear loading flap. The cover panel, in one example, is releasably connected to the rear loading flap via four connection points, with two connection points being arranged in the front region and two connection points being arranged in the rear region of the rear loading flap.

In a further embodiment of this disclosure, when the rear loading flap is in the closed position, the front edge of the cover panel contacts a front-side boundary of the storage area, and in particular contacts a rear bench seat. More particularly, when the rear loading flap is in the closed position, the front edge of the cover panel contacts an upper-side region of the rear bench seat, and the cover panel extends parallel to the storage area surface. The rear edge of the cover panel contacts the rear loading flap and is fastened thereto.

Further, when the rear loading flap is in an open position, the cover panel arranged such that it is spaced apart from the front-side boundary of the storage area, in particular from the rear bench seat. Specifically, the cover panel is displaced in the direction of the vehicle roof to increase a storage area opening. When moving to the open position of the rear loading flap, the cover panel is pivoted by the same angle as the rear loading flap, with the result that the rear edge is displaced into a position in which it is spaced apart from the rear bench seat. In the open position of the rear loading flap, the rear edge of the cover panel is situated in an upwardly displaced position in which it is spaced apart from the rear bench seat, with the result that the storage area opening, in particular the storage area height, is increased.

In an embodiment, the rear edge of the cover panel has one or more, such as two, rear connections which can be and/or are releasably connected to the rear region of the rear loading flap. It is possible, for example, for two connecting tabs made of a fabric-like material, such as fleece, to be fastened to the rear edge. Those tabs, in one example, have openings and/or cutouts and can be fastened to an inner surface (i.e., the inner cladding) of the rear loading flap by means of usual connections, such as clips, screws or pins or the like, or can be fastened to a glass surface or a window of the rear loading flap by means of adhesive connections. The connections are designed to be releasable such that the cover panel can be removed from the storage area.

In a further embodiment of this disclosure, the connecting element extends along at least a part of the respective side edges of the cover panel, and is pivotable about the side edge while being rigidly connected thereto. For example, the connecting elements can be designed as wings, in particular having a triangular shape, with a lower edge of the connecting element being rigidly connected to a side edge or at least a part of the side edge of the cover panel. To allow a space-saving storage of the cover panel, the connecting elements are pivotable about their connection to the side edge of the cover panel, with the result that the connecting elements can be arranged so as to contact an upper storage surface of the cover panel.

In still a further embodiment, the connecting element has a fastening point which is arranged above the rear edge of the cover panel and which is and/or can be releasably connected to the front region of the rear loading flap. In particular, a lower edge of the connecting element is connected to the side edge of the cover panel, with the connecting element extending upward in a planar manner and having a fastening point in its upper region, above the rear edge of the cover panel.

The connecting element may comprise a flexible, in particular fabric-like, material or consists of a flexible, in particular fabric-like, material, such as carpet fabric or fleece. In a particular embodiment, the upper storage surface of the cover panel is clad with the same fabric-like material, such as carpet fabric or fleece, from which the connecting elements and the connecting tabs are also produced.

To increase the storage area volume, the cover panel can be removed from the storage area and can be stored and/or stowed below the storage area surface, in particular below a removable loading surface floor. In order to facilitate such storage, the cover panel can be designed to be particularly thin or to have a small height and a planar surface. The connecting elements and the connecting tabs, which may consist of a fabric-like material, can, for storage purposes, each be pivoted into a position in which they bear against the upper storage surface of the cover panel. For storage, either the storage area surface or a loading surface floor arranged thereon can be removed from the storage area. The cover panel can then be arranged in a recess which is situated therebelow and which corresponds to the dimensions of the cover panel. The storage area surface or the loading surface floor is then arranged above the cover panel.

In order to obtain an improved NHV (noise, vibration and harshness) performance, the cover panel comprises a foamed material and/or consists of a foamed material having an in particular high density.

It should be noted that the features and measures presented individually in the following description can be combined with one another in any technically feasible manner and give rise to further embodiments of the invention. The description additionally characterizes and specifies the invention in particular in conjunction with the figures. In the various figures (i.e., FIGS. 1-3, discussed below), identical parts are provided with the same reference signs, and therefore they are generally also described only once.

With reference to the drawings, FIG. 1 illustrates an exemplary embodiment of a cover panel 100 according to the invention in a schematic perspective view. The cover panel 100 is of planar design and has a front edge 101 which points in the direction of the front of a motor vehicle, and an oppositely arranged rear edge 102 which points in the direction of the rear of the motor vehicle. A planar connecting element 104 is arranged along each of the side edges 103 of the cover panel 100. The transition between the side edges 103 and the rear edge 102 is rounded-off, with the connecting elements 104 extending exclusively along the rectilinear region of the side edge 103.

The connecting elements 104 have the shape of a right-angled triangle, with one of the legs being connected to the side edge 103 of the cover panel 100 and the other leg extending at a right angle both to the side edge 103 and to the front edge 101. Upper tips of the connecting elements 104 that face the vehicle roof have a fastening point 105 in the form of an opening and/or a cutout which is provided for receiving a clip, for example. The connecting elements 104 are connected in the manner of wings to the cover panel 100 and are produced from a flexible material. In this way, the connecting elements 104 can be pivoted about their connection to the respective side edge 103 and are arranged so as to bear flat on an upper placement surface 106 or a lower boundary surface 107 of the cover panel 100.

The cover panel 100 has, on the rear edge 102, two rear connections 108, in particular rear tabs each having a cutout and/or opening for receiving a clip. The connecting elements 104, the rear connections 108 and the placement surface 106 of the cover panels 100 are each produced from a fabric-like material, in particular a fleece or a carpet fabric.

Figure 2:
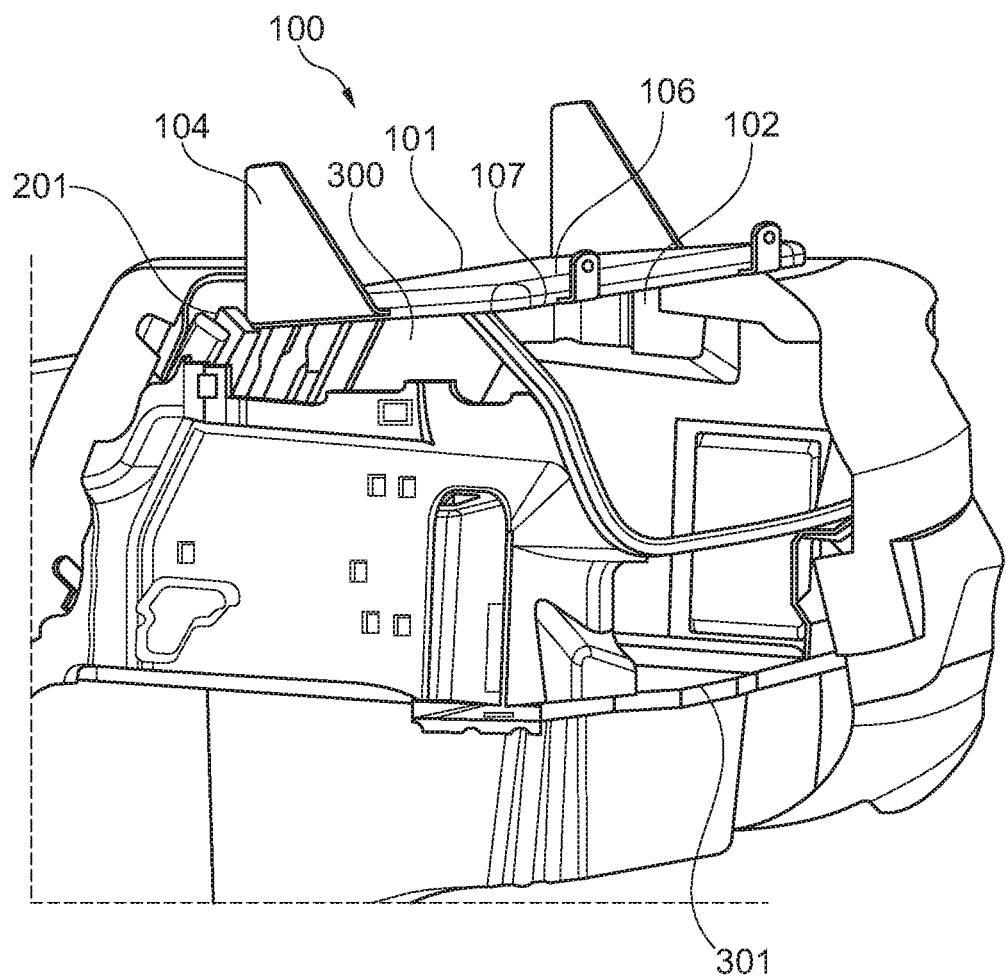
FIG. 2 illustrates the cover panel of FIG. 1 arranged adjacent a storage area of a motor vehicle.

FIG. 2 is a perspective schematic illustration of the cover panel 100 from FIG. 1 in a position in which it is arranged within a storage area 300, with the rear loading flap 200 (not shown here) of the vehicle situated in a closed position. The storage area 300 is representative of any of a number of such spaces which are known, such as the storage areas behind the rear seats commonly found in sport utility vehicles (SUVs). The storage area 300 may be referred to as a cargo area, cargo space, storage space, etc. This disclosure is not limited to any particular type of storage area, and extends to motor vehicles that would benefit from a freely-floating cover panel which provides a storage area cover without unduly interfering with loading.

With continued reference to FIG. 2, the cover panel 100 extends substantially parallel to the storage area surface 301 of the storage area 300. The front edge 101 of the cover panel 100 adjoins a front-side boundary 201 of the storage area 300, and in particular contacts the upper edge of a rear bench seat. The rear edge 102 adjoins the rear loading flap 200 (not shown). The storage area 300 is bounded on the upper side by the lower boundary surface 107 of the cover panel 100. The upper placement surface 106 can be reached from inside the passenger cell and can be used by the occupants to store various objects. The storage area 300 is bounded laterally by the inner cladding of the vehicle sides, along which the connecting elements 104 likewise extend.

Figure 3:
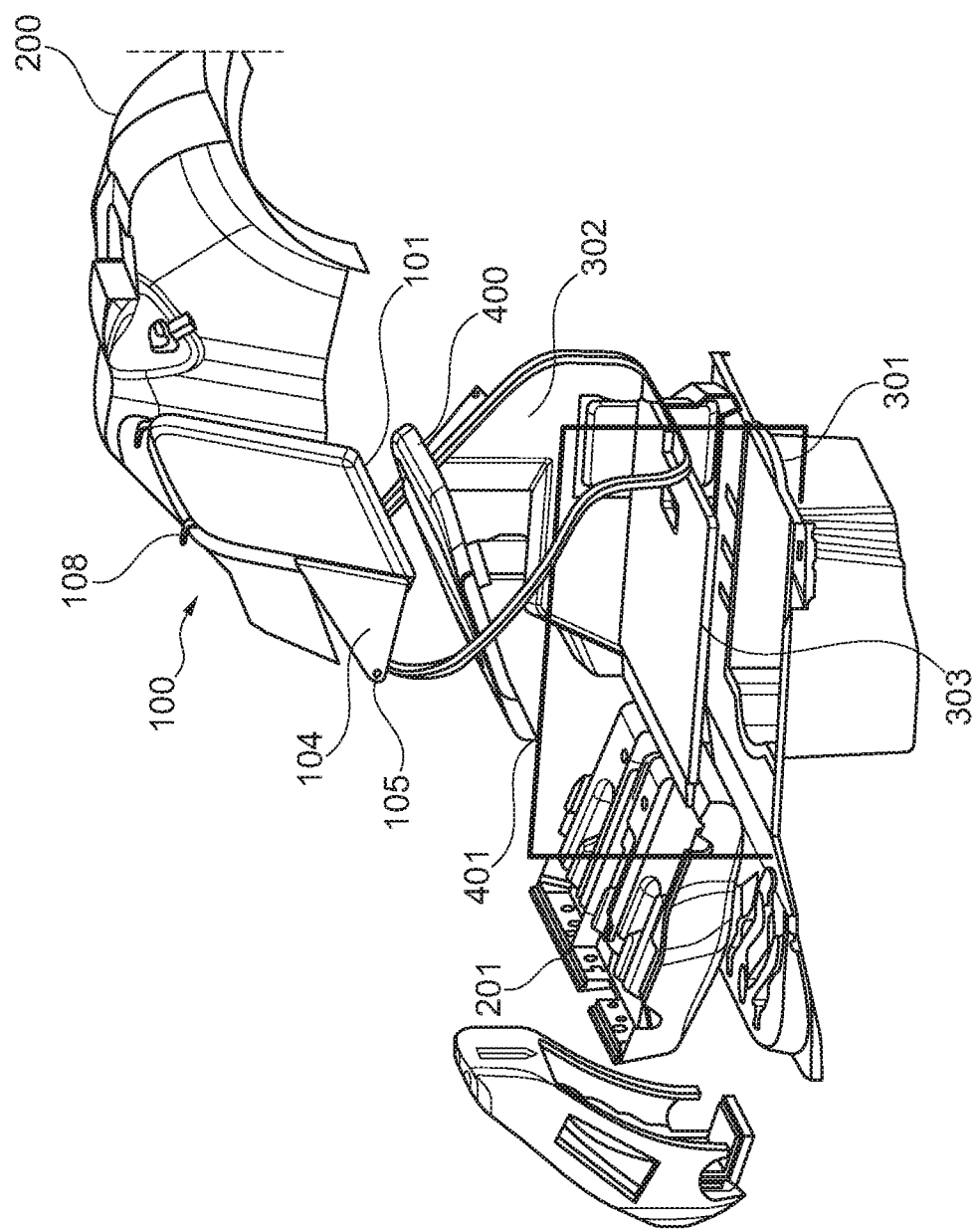
FIG. 3 illustrates the cover panel of FIG. 1.

FIG. 3 illustrates the cover panel 100 from FIG. 1 in a perspective schematic view, with the rear loading flap 200 situated in an open position. As generally mentioned above, the rear loading flap 200 may be any known type of rear loading flap, including a tailgate, liftgate, trunk lid, etc. The cover panel 100 is connected by means of its connecting elements 104 in a front region of the rear loading flap 200 to the lateral inner cladding thereof. The connection, in an example, includes a clip which is fastened on the one hand to the fastening point 105 and on the other hand to a lateral inner cladding of the rear loading flap 200.

In a rear region of the rear loading flap 200, the cover panel is fastened in the same or a similar manner by means of the rear connections 108. By virtue of the fastenings, the cover panel 100 is situated in a deflected and pivoted position when the rear loading flap 200 is in an open position.

By way of comparison, FIG. 3 additionally shows a parcel shelf 400 which is known from the prior art and which is fastened in a hinge-articulated manner by a front-side edge 401 to the front-side boundary 201, in particular to an upper edge of the rear bench seat, which is illustrated here in a folded-over position. It can be clearly seen that, in the open position of the rear loading flap 200, the storage area opening 302 is respectively bounded by the front edge 101 of the cover panel 100 according to the present disclosure or by the front-side edge 401 of the parcel shelf 400 known from the prior art. In the open position of the rear loading flap 200, the front edge 101 of the cover panel 100 is arranged so as to be upwardly displaced with respect to the front-side edge 401 of the parcel shelf 400 or the upper edge of the rear bench seats, with the result that, on the one hand, the storage area height and thus the storage area opening 302 are increased and, on the other hand, the storage area volume is increased. In other words, in one example, the cover panel 100 is vertically spaced above the top of the rear bench seats.

A loading surface floor 303 is arranged parallel to the storage area surface 301. The loading surface floor 303 can be removed from the storage area 300, with the result that the cover panel 100 can be stowed below the loading surface floor 303. For this purpose, the region between the storage area surface 301 and the loading surface floor 303 has a recess whose dimensions approximately correspond to the dimensions of the cover panel 100. When stored therein, the connecting elements 104 and rear connections 108 may be folded onto the upper placement surface 106 to make the cover panel 100 more compact.

It should be understood that terms such as "about," "substantially," and "generally" are not intended to be boundaryless terms, and should be interpreted consistent with the way one skilled in the art would interpret those terms. Further, terms such as "front" and "rear" are used herein with reference to a normal operational attitude of a motor vehicle, and should not otherwise be considered limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a rear loading flap providing access to a storage area; and
a cover panel connected to the rear loading flap such that, when the rear loading flap is in a closed position, the cover panel provides an upper boundary of the storage area and is supported solely by the rear loading flap, wherein the cover panel includes a connecting element along each side edge thereof, and each connecting element is releasably connected to the rear loading flap.

2. The motor vehicle as recited in claim 1, wherein, when the rear loading flap is in the closed position, the cover panel extends substantially parallel to a storage area surface that bounds the storage area on a lower side.

3. The motor vehicle as recited in claim 1, wherein the connecting elements have a fastening point arranged above a rear edge of the cover panel, and wherein the cover panel is releasably connected to the rear loading flap by way of a connection passing through the fastening point.

4. The motor vehicle as recited in claim 1, wherein, when the rear loading flap is in the closed position, a front edge of the cover panel contacts a rear seat of the motor vehicle while the cover panel remains completely supported by the rear loading flap without assistance from the rear seat.

5. The motor vehicle as recited in claim 4, wherein, when the rear loading flap is in an open position, the cover panel is vertically spaced above the rear seat.

6. The motor vehicle as recited in claim 1, wherein a rear edge of the cover panel includes at least one rear connection releasably connected to the rear loading flap.

7. The motor vehicle as recited in claim 6, wherein the at least one rear connection includes two rear connections.

8. The motor vehicle as recited in claim 6, wherein the at least one rear connection and the connecting elements are foldable onto an upper surface of the cover panel.

9. The motor vehicle as recited in claim 6, wherein the connecting elements are foldable about the side edge while being rigidly connected thereto.

10. The motor vehicle as recited in claim 1, wherein the connecting elements comprise a flexible material.

11. The motor vehicle as recited in claim 10, wherein the connecting elements comprise fabric.

12. A motor vehicle, comprising:
a rear loading flap providing access to a storage area;
a cover panel connected to the rear loading flap such that, when the rear loading flap is in a closed position, the cover panel provides an upper boundary of the storage area and is supported solely by the rear loading flap; and a lower area beneath a removable loading surface floor of the storage area, wherein the cover panel can be detached from the rear loading flap and stored in the lower area.

13. The motor vehicle as recited in claim 1, wherein the cover panel comprises a foamed material.

14. A method, comprising:

closing a rear loading flap of a motor vehicle so as to arrange a cover panel adjacent a storage area of a motor vehicle, wherein the cover panel provides an upper boundary of the storage area and is supported solely by the rear loading flap, wherein the cover panel includes a connecting element along each side edge thereof, each connecting element being releasably connected to the rear loading flap; and detaching the cover panel from the rear loading flap by detaching the connecting elements from the rear loading flap.

15. The method as recited in claim 14, further comprising:

opening the rear loading flap of the motor vehicle such that the cover panel becomes spaced vertically above a rear seat of the motor vehicle.

16. The method as recited in claim 14, wherein the cover panel includes at least one rear connection releasably connected to the rear loading flap, and wherein the method further comprises detaching the cover panel from the rear loading flap by detaching the rear connection from the rear loading flap.

17. The method as recited in claim 16, further comprising folding the connection elements and the rear connection onto an upper surface of the cover panel.

18. The method as recited in claim 17, further comprising storing the cover panel in an area beneath a loading surface floor of the storage area.

* * * * *